(No Model.) 2 Sheets—Sheet 2.
R. H. ANDREWS.
MORTISING AND BORING MACHINE.
No. 304,060. Patented Aug. 26, 1884.
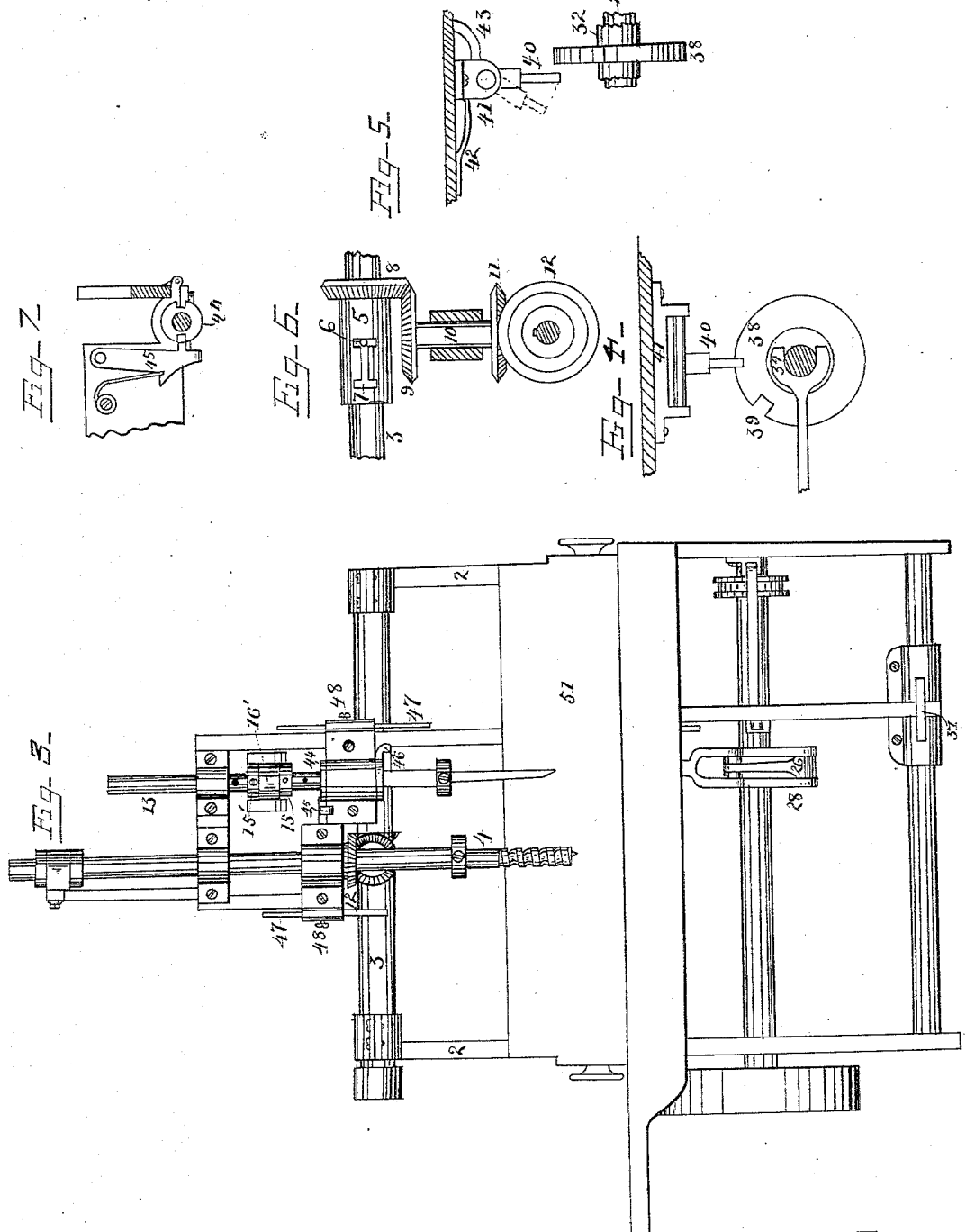
Witnesses
C. H. Brown
W. C. Gates
Inventor
Reuben H. Andrews
per Warwick & Bartlett
his attorneys

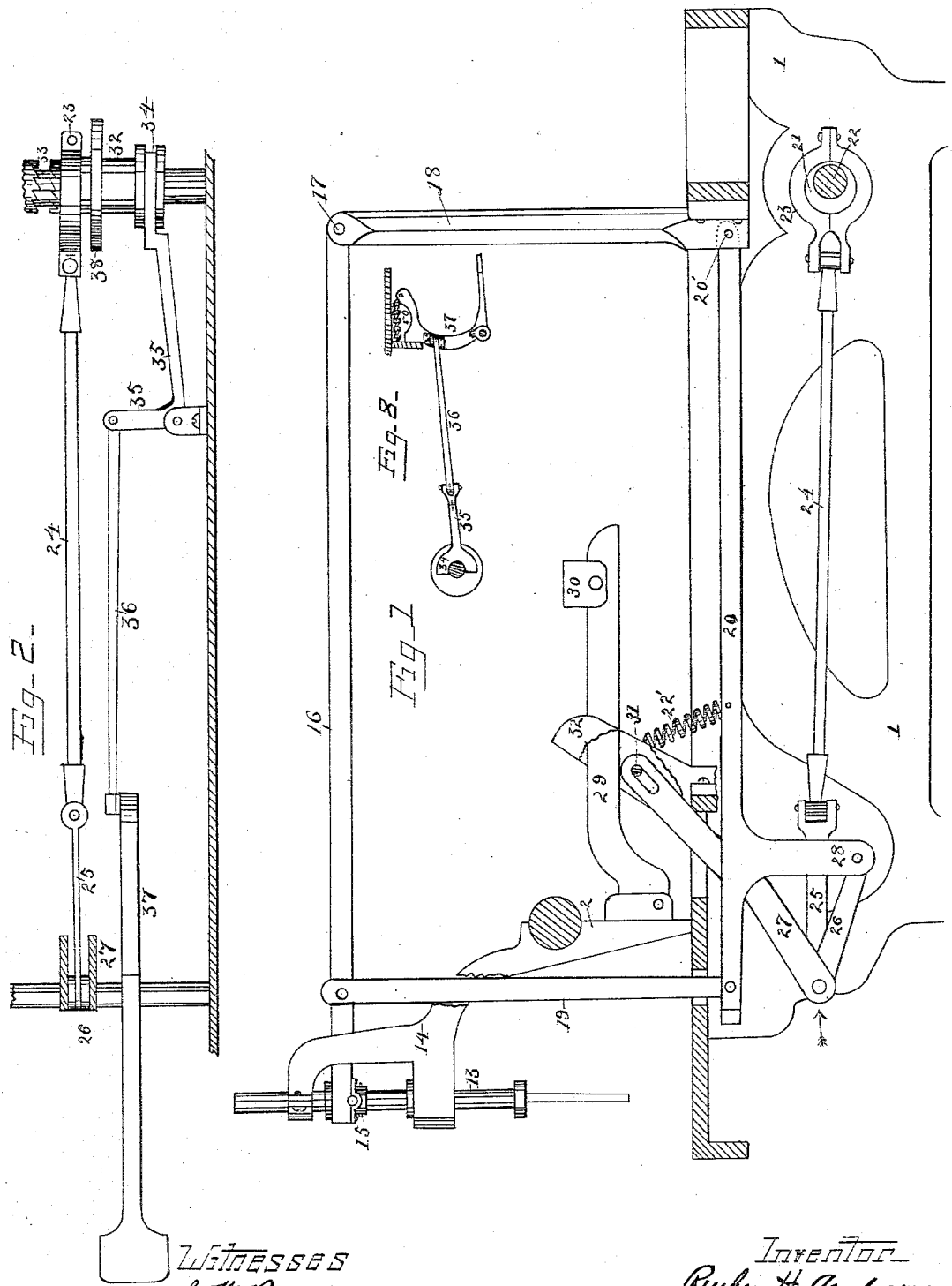

UNITED STATES PATENT OFFICE.

REUBEN HENRY ANDREWS, OF WASHINGTON, DISTRICT OF COLUMBIA.

MORTISING AND BORING MACHINE.

SPECIFICATION forming part of Letters Patent No. 304,060, dated August 26, 1884.

Application filed October 2, 1883. (No model.)

*To all whom it may concern:*

Be it known that I, REUBEN HENRY ANDREWS, a citizen of the United States, residing at Washington, in the District of Columbia, have invented certain new and useful Improvements in Mortising and Boring Machines, of which the following is a specification, reference being had therein to the accompanying drawings.

This invention relates to mortising and boring machines, and is specially intended to provide an attachment for my complete wood-worker as covered by Patent No. 250,181, of November 29, 1881; but the device may be used as an attachment for other machines, or as an independent machine.

The particular features of the device which forms the subject of my present invention will be hereinafter pointed out in the claims.

In the drawings Figure 1 is a longitudinal section of so much of the machine as is necessary to show the chisel operating and relieving mechanism. Fig. 2 is a plan view of the clutch mechanism and treadle. Fig. 3 is a front view showing part of the machine with the mortising and boring attachment. Figs. 4 and 5 are details showing the clutch-shifting mechanism, side and front views. Fig. 6 is a plan view of the collar and gear for driving the auger. Fig. 7 is a detail showing the chisel-catch. Fig. 8 is a side view of the treadle and connections on reduced scale.

The device for operating the chisel and the relieving-lever, to prevent breakage when the chisel strikes an obstruction or knot in the wood so obdurate as to endanger the machine, is shown in Fig. 1.

1 is the frame of the machine. Brackets 2 2 on the frame form the head-stock of a lathe, which is not shown, but of which the shaft 3 may be the live-spindle. This spindle may be driven in any suitable manner, and serve as the driving-shaft of the auger 4. A sleeve, 5, on the shaft 3 is held from turning by pin 6, which projects into the H-shaped slot 7 in the sleeve. A bevel-gear, 8, on said sleeve engages a similar gear, 9, on shaft 10, which drives a bevel-gear, 11, which drives the bevel-gear 12, that is splined to the shaft of auger 4. By a lever or treadle, as is common, the auger is moved down far enough to engage the work. The chisel-bar 13 is supported in a bracket, 14, and has a collar, 16', which is attached to lever 16 by trunnions, and rests between collars 15 and 15' on the chisel-bar, so that the vibration of said lever will move the chisel-bar up or down. The lever 16 is pivoted at 17 to standard 18. A draw-rod, 19, connects lever 16 to lever 20, which is pivoted at 20'. The levers 16 and 20, therefore, move together. A spring, 22', ordinarily holds both levers elevated. The levers 16 and 20 are drawn down ordinarily by the operation of cam 21 when this cam is thrown into gear. This cam is on a constantly-rotating shaft, 22, and has a collar, 23, of usual construction, to which a draw-rod, 24, is attached. The draw-rod 24 is pivoted at one end to collar 23, and at the other end to draw-bar 25. The draw-bar 25 is attached at the joint to toggle-levers 26 27. The lever 26 is pivoted to an extension of lever 20 at 28, and the lever 27 has its fulcrum against lever 29, which is pivoted to the frame or bracket, and may be held down by an adjustable weight, 30, or by a spring. The upper end of lever 27 is slotted, and a pin, 31, passes through said slot, or the lever is held by other convenient means in a slot or groove in part 32, so as to bear against lever 29. When the draw-bar 25, by the rotation of cam or eccentric 21, is moved in the direction of the arrow, the knee or toggle will be somewhat straightened. The lever 29 will hold the lever 27 so that it cannot rise under ordinary circumstances. The lever 26 will therefore force down the lever 20, and with it the draw-rod 19 and the chisel-bar; but should the chisel encounter an obstruction so great as to endanger the machine, the pressure will overcome the resistance of weighted lever 29 to the upward movement of lever 27, and instead of moving down lever 20, the effect of the toggle mechanism will be to raise lever 29. By this mechanism the cam or eccentric will cause the chisel to fall once with each rotation, unless the chisel encounter too great resistance, when the rotation of the cam will simply raise lever 29. The eccentric 21 is attached to a sleeve, 32, which has one jaw, 33, of a clutch mechanism thereon. The other jaw of the clutch is secured to shaft 22. The sleeve 32 slides freely on shaft 22, and has collars thereon, between which the forked end 34 of a bell-crank lever, 35, rests. This lever 35 is connected by rod 36 to treadle 37. A pressure on this treadle thus tends to slide the sleeve 32 on the shaft 22 and throw the clutch-gear into engagement. A disk, 38, on sleeve 32 is notched at 39. A hanger, 40, pivoted in bracket 41, extends downward from the table. The hanger may swing a little way in one direction against the pressure of spring 42, but is held from swinging the other way by arm 43, which extends against the table or frame. When the sleeve 32 is shifted so that the clutch-jaw 33 is put in engagement with the other jaw of the clutch, by pressing on the treadle, as heretofore described, the disk will (if the notch be in line with the hanger 40) pass by said hanger, and will be unable to return, except when the notch 39 is in line with the hanger. If the notch be not in line with the hanger, then the disk will push the hanger slightly to one side, as shown in dotted lines, Fig. 5, until the notch does come in line with the hanger, when the spring will throw it through the notch. The disk will be then unable to return, except when the notch is in line with the hanger. The notch and hanger are so located that the disk and sleeve can only be moved to uncouple the clutch, when the chisel is at the top of its stroke. Consequently, whenever the chisel is stopped it is in raised position. The treadle is drawn up by a spring, 50, which tends constantly to uncouple the clutch, so that when the foot is removed from the treadle the clutch will uncouple automatically and stop in its upmost position as soon as the notch 39 is in position to pass the hanger 40. The chisel-bar may be adjusted up or down relatively to lever 16 by shifting the collars 15 15' on said bar. These collars are held to the bar by set-screws or pins, which pass into or through the bar. A collar, 44, on a sleeve splined to the chisel-bar is engaged by spring-catch 45 taking into one or the other of the notches therein, to hold the chisel in either of its cutting positions. The thumb-catch 46 forms a convenient means for turning the chisel-bar through an arc of one hundred and eighty degrees, so that it may cut right or left. Gages 47 slide through eyes or mortises in the standard, and may be pressed down to rest on the work, and held by set-screws 48. The face-plate 51 is adjustable toward or from the chisel, so as to cut a mortise at a greater or less distance from the side of the work.

The whole device forms a part of my complete wood-working machine as last constructed; but, as before stated, some portions may be used separately.

I claim—

1. The combination, with suitable driving mechanism, of a toggle-lever adapted to operate a mortising-chisel through suitable connections, substantially as described, and an automatic relieving-lever which bears on one arm of the toggle-lever, substantially as set forth.

2. The combination, with a draw-bar operated by suitable driving mechanism, as set forth, of a toggle-lever with which said draw-bar is connected at the joint, a lever connected with one arm of the toggle to operate the chisel, and a relieving-lever which bears upon the other arm of the toggle, as and for the purpose stated.

3. The driving-shaft bearing a cam or eccentric, the draw-bar actuated by said cam, the toggle-lever with which said draw-bar is connected at the joint, the chisel-actuating lever connected to one arm of the toggle, and the weighted relieving-lever, which bears on the other end of the toggle.

4. The chisel-driving lever 16, pivoted at the rear of the machine and connected to chisel-bar, as described, the lever 20, parallel with said lever 16, and connected thereto by a draw-bar, the toggle-lever and driving mechanism connected to said lever 20, as described, and the relieving-lever bearing on one arm of the toggle-lever, all in combination, as set forth.

5. The combination, with the chisel-bar of the lever 16, of the collar which embraces said chisel-bar, and the collars 15 and 15', one at each side of said first-mentioned collar, and the retaining devices of the same, whereby the chisel-bar may be adjusted with relation to its driving-lever, as set forth.

6. The combination, with the sleeve 32 on the driving-shaft, its clutch, and the chisel-driving mechanism consisting of the levers and connections, substantially as described, leading to the chisel-bar, of the treadle and connecting mechanism, substantially as described, whereby the clutch is thrown into engagement, as stated.

7. The shifting sleeve on the driving-shaft and its chisel-driving connections, the treadle and its connections, as described, for shifting said sleeve, and mechanism, substantially as described, adapted to retain the clutch in coupled position, and only permit the uncoupling at a point where the chisel is in elevated position, all in combination, as set forth.

8. The combination, with the shifting sleeve and its chisel-driving connections, and mechanism, substantially as described, for shifting said sleeve, of a notched disk on said sleeve, and a hanger adapted to engage said disk and only permit it to be shifted at such points as brings the notch in line with the hanger, as set forth.

9. The sleeve and its chisel-driving mechanism, a treadle and connections for shifting the sleeve, a notched disk on said sleeve, and a swinging hanger adapted to yield in one direction, but to hold the disk against movement in the other, all arranged and combined substantially as stated.

10. A bracket-support for a mortising and boring machine, and in combination therewith the live-spindle of a lathe, shifting mechanism on said spindle, substantially as described, and a train of driving mechanism, substantially as described, for connecting the lathe-spindle with the boring-bar, as set forth.

11. A bracket-support for a mortising and boring machine, a lathe-spindle supported thereby, a shifting sleeve on said spindle, and bevel-gears and shaft, as described, whereby motion may be transmitted from the lathe-spindle to the boring-bar, as set forth.

In testimony whereof I affixed my signature in presence of two witnesses.

REUBEN HENRY ANDREWS.

Witnesses:
 A. M. KANOUSE,
 D. S. CURTISS.